United States Patent [19]

Harrison

[11] 4,076,076
[45] Feb. 28, 1978

[54] MECHANICAL HEAT EXCHANGE JOINT
[75] Inventor: Henry Harrison, Locust Valley, N.Y.
[73] Assignee: Halm Instrument Co., Inc., Glen Head, N.Y.
[21] Appl. No.: 704,374
[22] Filed: Jul. 12, 1976
[51] Int. Cl.² .......................... F24J 3/02; F28F 1/14; F28F 1/22
[52] U.S. Cl. ............................... 165/171; 29/157.3 C; 126/271; 165/183
[58] Field of Search .................... 165/171, 81, 183; 29/157.3 C; 126/271

[56] References Cited

U.S. PATENT DOCUMENTS

| | | | |
|---|---|---|---|
| 2,049,117 | 7/1936 | Hubert | 165/171 |
| 2,441,463 | 5/1948 | Achs | 165/171 |
| 2,469,963 | 5/1949 | Grosjean et al. | 165/171 |
| 2,509,011 | 5/1950 | Moore | 165/171 |
| 2,734,259 | 2/1956 | Beck | 29/157.3 C |
| 2,856,163 | 10/1958 | Bidak et al. | 165/171 |
| 3,120,869 | 2/1964 | Carpenter | 165/171 |
| 3,224,503 | 12/1965 | Konanz | 165/171 |
| 3,407,874 | 10/1968 | Gier, Jr. | 165/171 |
| 3,818,568 | 3/1973 | Sennstrom | 29/157.3 C |

FOREIGN PATENT DOCUMENTS

| | | | |
|---|---|---|---|
| 208,581 | 6/1957 | Australia | 165/171 |
| 851,203 | 7/1952 | Germany | 165/171 |

Primary Examiner—Charles J. Myhre
Assistant Examiner—Sheldon Richter
Attorney, Agent, or Firm—James P. Malone

[57] ABSTRACT

A heat-conducting joint suitable for solar heat collectors. A tubular metal member carries heat-transfer fluid. A sheet metal member is in thermal contact with said tubular member and one of the members is pre-curved in a plane perpendicular to the surface of the sheet into a wave shape substantially consisting of a plurality of long radius arches joined by short radius cusps. Means are provided for first securing the other member while straight to the one member near its ends in a manner to prevent sliding of the other member on the one member. Means are provided for then securing said other member against the one member at the short radius cusps, whereby the two members are pressed together elastically along at least one line of contact for efficient heat conduction between them.

7 Claims, 4 Drawing Figures

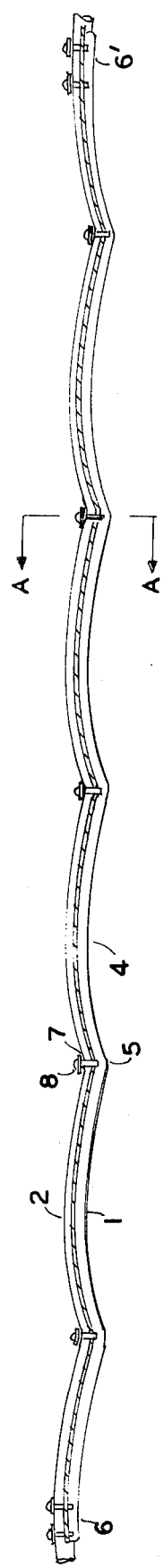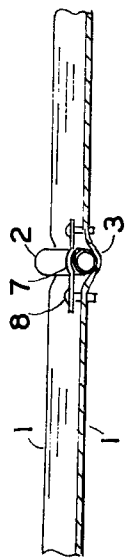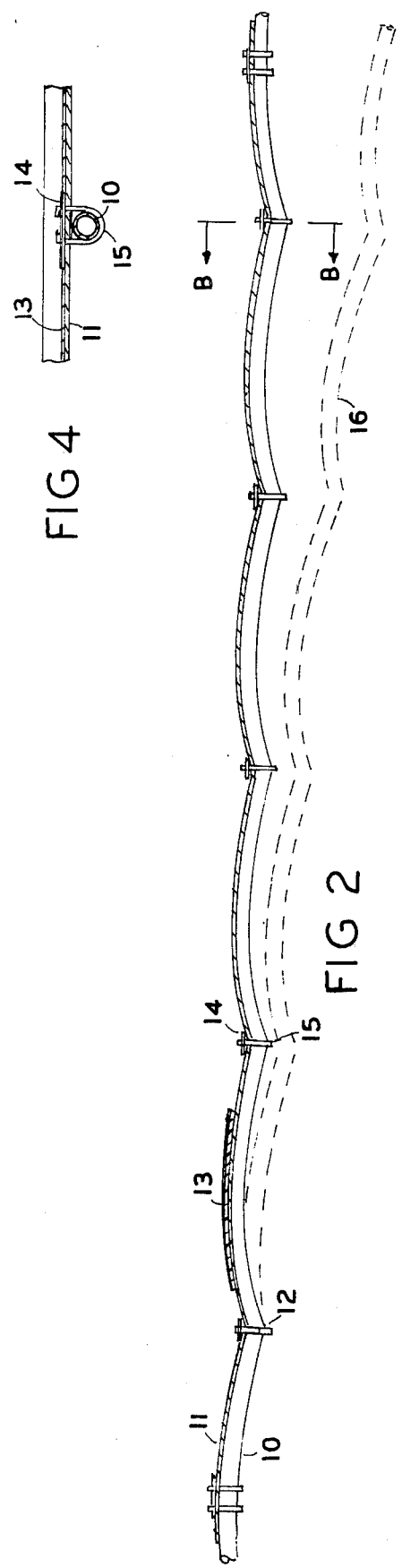
FIG 1
FIG 3
FIG 4
FIG 2

MECHANICAL HEAT EXCHANGE JOINT

In the construction of solar heat collectors, it is frequently necessary to achieve a good thermal contact between a corrosion-resistant tube and a heat-absorbing plate. Because the joint is likely to be subjected to an extreme temperature range, both pieces are generally of metal. The tube is frequently of copper, which, although expensive, is one of the best metals for resisting corrosion. The heat-absorbing plate can also be of copper, but steel or aluminum have a cost advantage, even though they have lower heat conductivity.

The degree of thermal conductance of the joint should be as good or better than the so called film conductance at the interfce between the tube and the heat transfer fluid inside it. A narrow contact formed by mechanical contact between the pieces is sufficient by this standard. However, it has been difficult, in the face of differential temperature, differential thermal expansion, and practical fabricating techniques to maintain even this good a contact without soldering, brazing, welding or monolithic structures.

This invention shows how to provide such a thermal joint with a minimum of fabrication and with very simple mechanical fastening devices.

Accordingly, a principal object of the invention is to provide new and improved heat exchange joint.

Another object of the invention is to provide new and improved mechanical heat exchange joint for solar heat collectors.

Another object of the invention is to provide new and improved mechanical heat exchange joint without soldering, brazing or welding.

Another object of the invention is to provide a new and improved heat-conducting joint suitable for solar heat collectors comprising, a tubular metal member for carrying heat-transfer fluid, a sheet metal member in thermal contact with said tubular member, one of said members being pre-curved in a plane perpendicular to the surface of the sheet into a wave shape substantially consisting of a plurality of long radius arches joined by short radius cusps, and means for first securing the other member while straight to the one member near its ends in a manner to prevent sliding of the other member on the one member, and means for then securing said other member against said one member at said short radius cusps, whereby the two members are pressed together elastically along at least one line of contact for efficient heat conduction between them.

FIG. 1 is an elevation view of a joint according to this invention.

FIG. 2 is a differently proportioned joint according to this invention.

FIG. 3 is a sectional view of the joint of FIG. 1, taken at A-A.

FIG. 4 is a sectional view of the joint of FIG. 2, taken at B-B.

In the embodiment of FIG. 1, a steel absorber plate 1, is joined to a copper tube 2. The plate is first formed with a longitudinal straight groove 3, of smaller radius than the tube, is then bent into a wave shape resembling a series of shallow long-radius circular segments 4, joined by short-radius cusps 5. The tube 2, still straight, is laid in the central groove 3, and clamped securely to the plate at the ends 6 and 6', and then drawn down into the cusps 5. Saddle pieces 7, with screws 8, may be used for assembly. Stretching of the tube as it is pulled down produces two tight longitudinal thermal joints where the tube contacts the inside surface of the groove. Elastic deformation of both tubing and plate store energy to keep the joint tight through minor flexing and through thermal cycling.

In this embodiment, the assembly can be finished with any suitable black sun-absorbing paint.

There is an ideal minimum arc for the wave shape which stresses the copper just beyond its yield point, to store a maximum amount of elastic energy in the system. This arc is given by the equation, $$RA - R \sin A / RA = 1.5 \, S/E \simeq 1/6 \, A^2$$

where $R$ is the radius of curvature.
$A$ is the arc half angle in radians,
$S$ is the yield stress of copper, and
$E$ is the Young's modulus of copper.

If $S/E$ is $10^{-3}$, then $A$ is approximately .04 radians, or $2\frac{1}{2}°$. For a wave length between cusps of $L$ inches, the radius of curvature of the arches is given by $2 \, AP = L$, and the height $H$ of the arches becomes $$H = R(1-\cos A) \simeq L/2A \cdot A2/2 = L/4A$$

Thus, for example, if $L = 18$ inches between fasteners,
$R$ max. $= L/0.8 = 12.5 \times 225$ inches $= 18$ ft. 9 ins.

$H$ min. $= L \, A/4 = 0.01L = 0.18$ inches

The assumption here has been that the curved steel strip does not flex significantly. The groove or channel in the steel should place the center of the copper tubing substantially at the center of the steel plate so that bending moments are minimized.

When the temperature rises, the copper tends to expand more than the steel. Under normal operation, the pressure between copper and steel will be relaxed by about 25% when the temperature srises 100° F. At maximum temperatures of 400° F., the copper will barely touch the steel.

In FIG. 3, the situation is reversed. The copper tube 10, is pre-bent in a wave pattern, and a copper sheet 11, is pulled down against it at the cusps 12, to produce elastic contact along the line of tangency of the tube with the sheet. For reasons of economy, the copper sheet will generally be fairly thin, and it may be pre-coated with a selective sun-absorbing black surface 13, such as copper oxide which does not radiate infrared. Since the surface is rather delicate, a minimum of work should be done on this piece before assembly. It may, therefore, be preferred to assemble this sheet to the tubing using reinforcing plates 14, and stapling through the sheet and the plates with heavy wire staples 15, to bind the sheet 11 in assembly with the tube 10. In some embodiments it may be preferred to secure the ends with fused metal as by soldering, brazing or welding.

Since in the embodiment there is little differential expansion between tube and sheet, both being copper, it is unnecessary to form a groove in the sheet to eliminate bending moments. It is then desirable, however, to give the tube a general full length curve, such as shown in phantom at 16, as well as the arches and cusps of the final wave shape. In the assembly process the tube is held generally straight, so that the final assembly is wavy but generally straight, sprung to resist the bending moment of the tensioned strip 11. The amount of this general curvature that is required depends on the cross-section of the sheet and the stiffness of the tube, as well as the cusp angle of the waves.

Having now described two embodimens of this invention so that they may usefully be fabricated by those skilled in the art, what is claimed as new and useful is:

1. A heat-conducting joint suitable for solar heat collectors comprising,
   a tubular metal member for carrying heat-transfer fluid,
   a sheet metal member in thermal contact with said tubular member, one of said members being pre-curved in a plane perpendicular to the surface of the sheet into a wave shape substantially consisting of a pluality of long radius arches joined by short radius cusps, and
   means for first securing the other member while straight to the one member near its ends and while perpendicular to the long radius arches of the wave shape in a manner to prevent sliding of the other member on the one member, and
   means for then securing said other member against said one member at said short radius cusps forming a wave shape in said other member,
   whereby the two members are pressed together elastically along at least one line of contact for efficient heat conduction between them.

2. A heat conducting joint according to claim 1, in which said one member is said sheet metal member and said other member is said tubular metal member.

3. A heat-conducting joint according to claim 1, in which said sheet metal member is preformed with a longitudinal groove which makes contact with said tubular member along two lines of contact.

4. A heat-conducting joint according to claim 1, in which said means for securing said tubular metal member to said sheet metal member in a manner to prevent sliding is by fused metal.

5. A heat-conducting joint according to claim 1, in which said means for securing said tubular metal member to said sheet metal member at said cusps is by mechanical fasteners.

6. A heat-conducting joint according to claim 1, in which said sheet metal member is preformed with a longitudinal groove which places the center of said tubular metal member substantially at the center of said sheet metal member when the two members are assembled together.

7. A heat-conducting joint according to claim 6, in which said sheet metal member and said tubular metal member have dissimilar coefficients of thermal expansion.

* * * * *